C. S. HOMSHER.
DROP CORD CAP FOR ELECTRIC CONDUIT OUTLET BOXES.
APPLICATION FILED SEPT. 8, 1910.
1,002,061.
Patented Aug. 29, 1911.
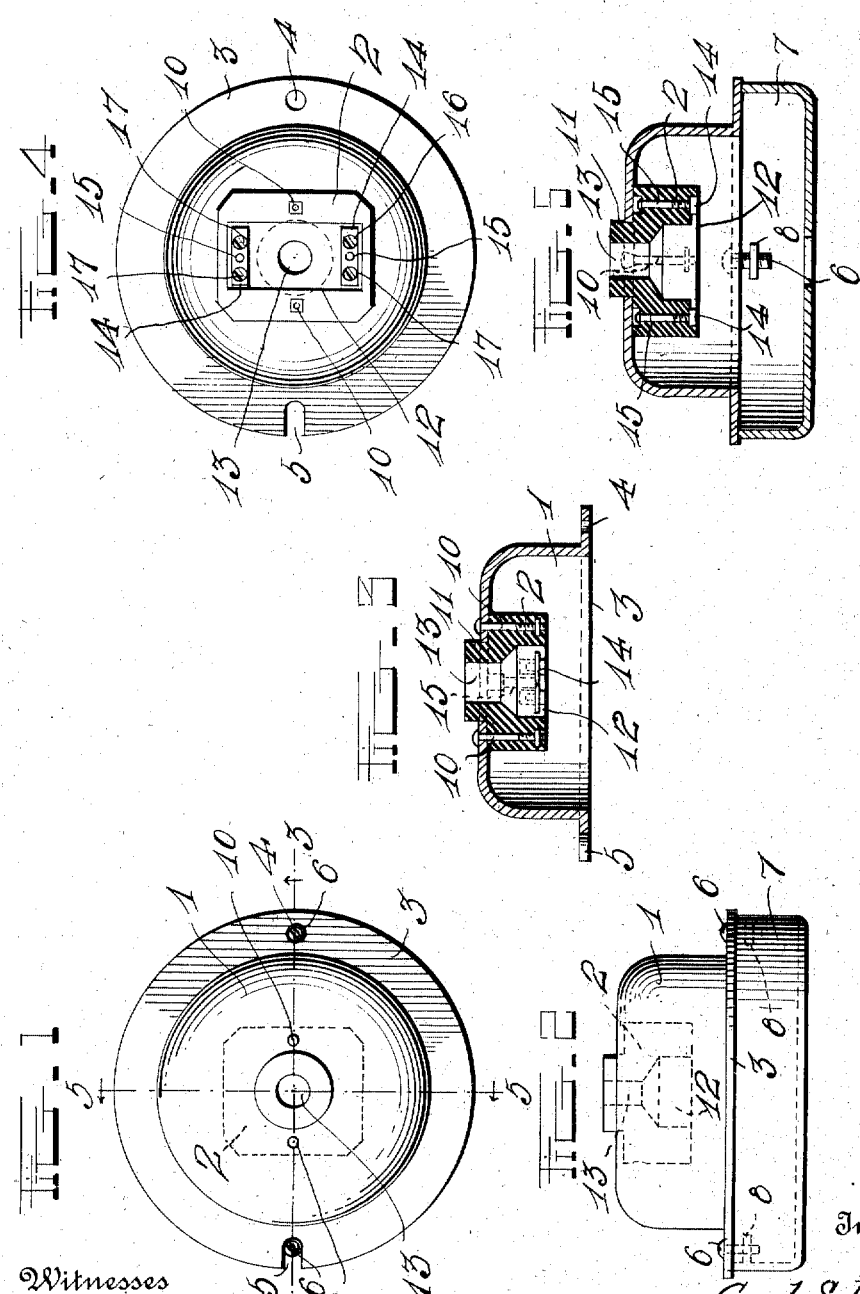
Witnesses
C. R. Hardy
O. B. Hopkins
Inventor
Carl S. Homsher
by H. B. Willson & Co.
Attorneys

UNITED STATES PATENT OFFICE.

CARL S. HOMSHER, OF DENVER, COLORADO.

DROP-CORD CAP FOR ELECTRIC-CONDUIT OUTLET-BOXES.

1,002,061.   Specification of Letters Patent.   Patented Aug. 29, 1911.

Application filed September 8, 1910. Serial No. 580,980.

*To all whom it may concern:*

Be it known that I, CARL S. HOMSHER, a citizen of the United States, residing at Denver, in the county of Denver and State of Colorado, have invented certain new and useful Improvements in Drop-Cord Caps for Electric-Conduit Outlet-Boxes; and I do declare the following to be a full, clear, and exact description of the invention, such as will enable others skilled in the art to which it appertains to make and use the same.

This invention relates to improvements in drop cord caps for electric conduit outlet boxes.

One object of the invention is to provide a cap of this character by means of which electric conduit wires and drop cord wires may be connected without soldering.

Another object is to provide a drop cord cap having a porcelain insulating block provided with a neck adapted to project through the casing to form a bushing through which the drop cord is adapted to pass.

A further object is to provide a cap of the character described which will be simple and inexpensive in construction and provided with means whereby the same may be quickly and easily attached to the conduit outlet box.

With the foregoing and other objects in view, the invention consists of certain novel features of construction, combination and arrangement of parts as will be more fully described and particularly pointed out in the appended claim.

In the accompanying drawings: Figure 1 is a plan view of my improved drop cord cap; Fig. 2 is a side view of the same attached to an ordinary shallow outlet box; Fig. 3 is a central vertical section on the line 3—3 of Fig. 1; Fig. 4 is an inside plan view; Fig. 5 is a central vertical sectional view taken at right angles to Fig. 3 on the line 5—5 of Fig. 1 and showing the cap attached to the conduit outlet box.

In the accompanying drawings, 1 denotes my improved cap which is formed of metal or other suitable material and is of sufficient depth to receive a porcelain insulating block 2 hereinafter described. The cap is provided with an annular box engaging flange 3 having in one side a screw hole 4 and in its opposite side a slot 5 adapted to receive fastening screws 6 whereby the cap is secured to the ordinary or any suitable form of conduit outlet box 7. The screws 6 when passed through the hole and slot are adapted to engage threaded apertures in attaching lugs 8 arranged in the box as shown.

In the outer portion of the cap is arranged the porcelain insulating block 2, said block being secured in place by screws or bolts 10. The insulating block 2 is provided with a reduced neck adapted to project through an aperture in the outer side of the cap thereby forming a bushing 11. The block 2 is provided in its inner side with a rectangular recess 12 and a central passage 13 the reduced end of which extends through the bushing as shown and forms the opening through which the drop cords enter the cap.

In the recess 12 of the block on opposite sides of the passage 13 are arranged terminal plates or bars 14 said bars being secured in place by fastening screws 15 arranged therethrough and through the block as shown. In the opposite ends of the plates or bars 14 are formed threaded passages. With the passages in one end of the bars are engaged the terminal screws 16 of the conduit wires while with the apertures in the opposite ends of the bars are engaged the connecting screws 17 for the ends of the drop cord wires, (not shown).

The body portion of the porcelain insulating block is preferably left rough and only the exposed neck portion forming the bushing 11 is glazed.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention, what I claim is:

A drop cap for electric circuit terminal boxes comprising a hollow body portion with an aperture therein, an insulating block having a reduced neck inserted through the aperture and projecting above the same so as to form a bushing, the block having on its inner side a rectangular recess and a passage, and metallic plates secured to the opposite short end walls of said recess.

In testimony whereof I have hereunto set my hand in presence of two subscribing witnesses.

CARL S. HOMSHER.

Witnesses:
SAMUEL N. MITCHELL,
STANLEY M. WRIGHT.